UNITED STATES PATENT OFFICE.

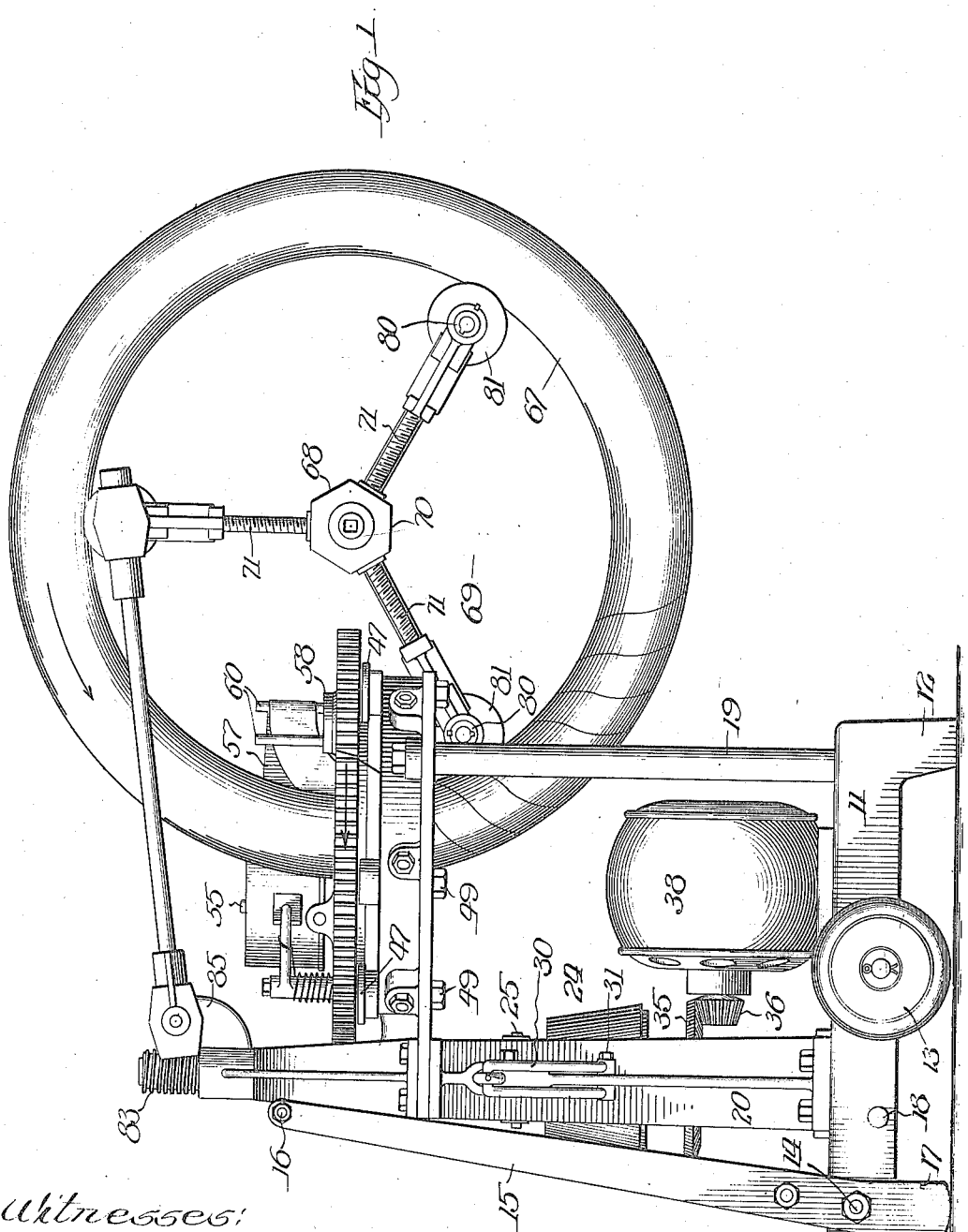

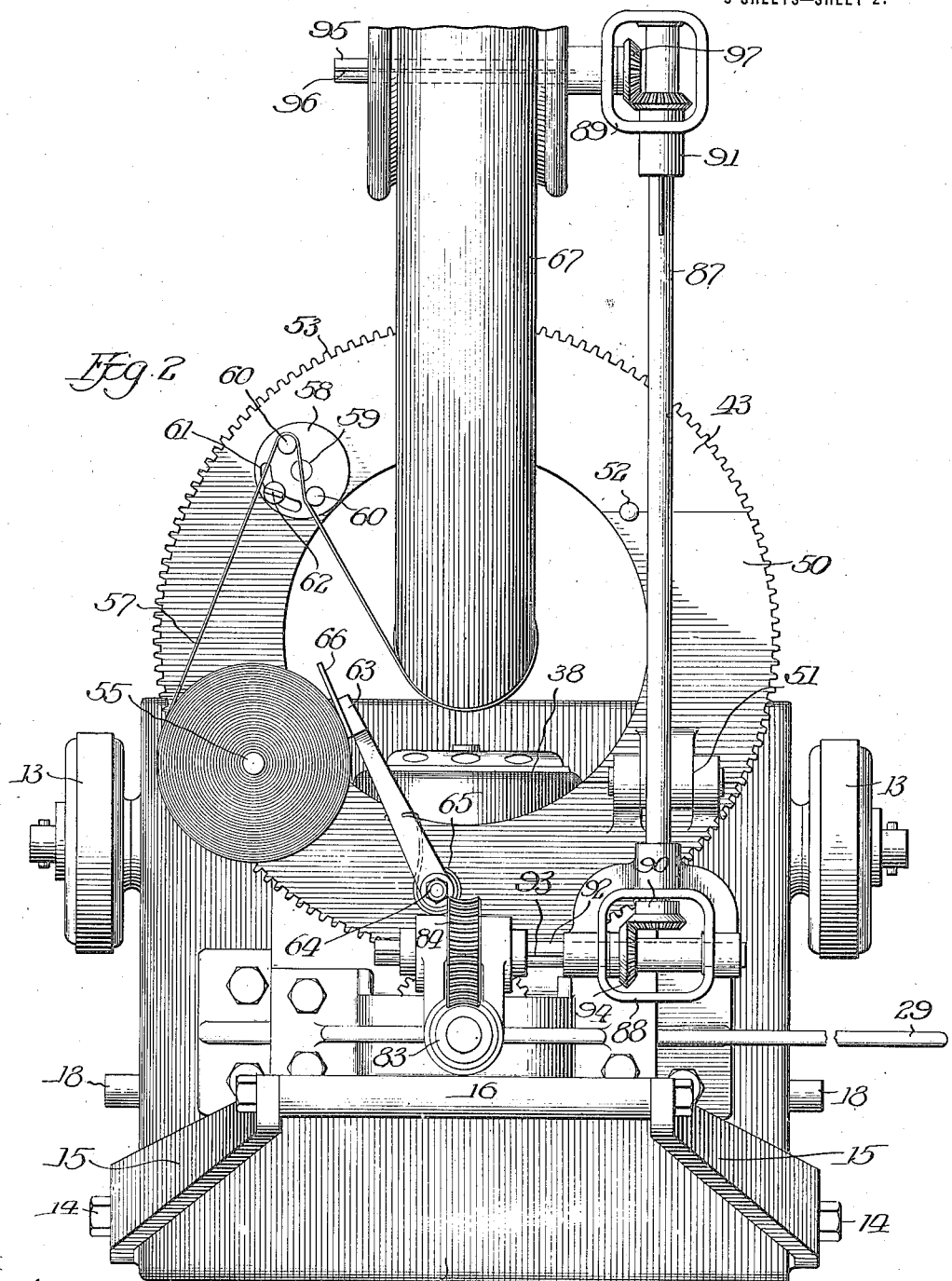

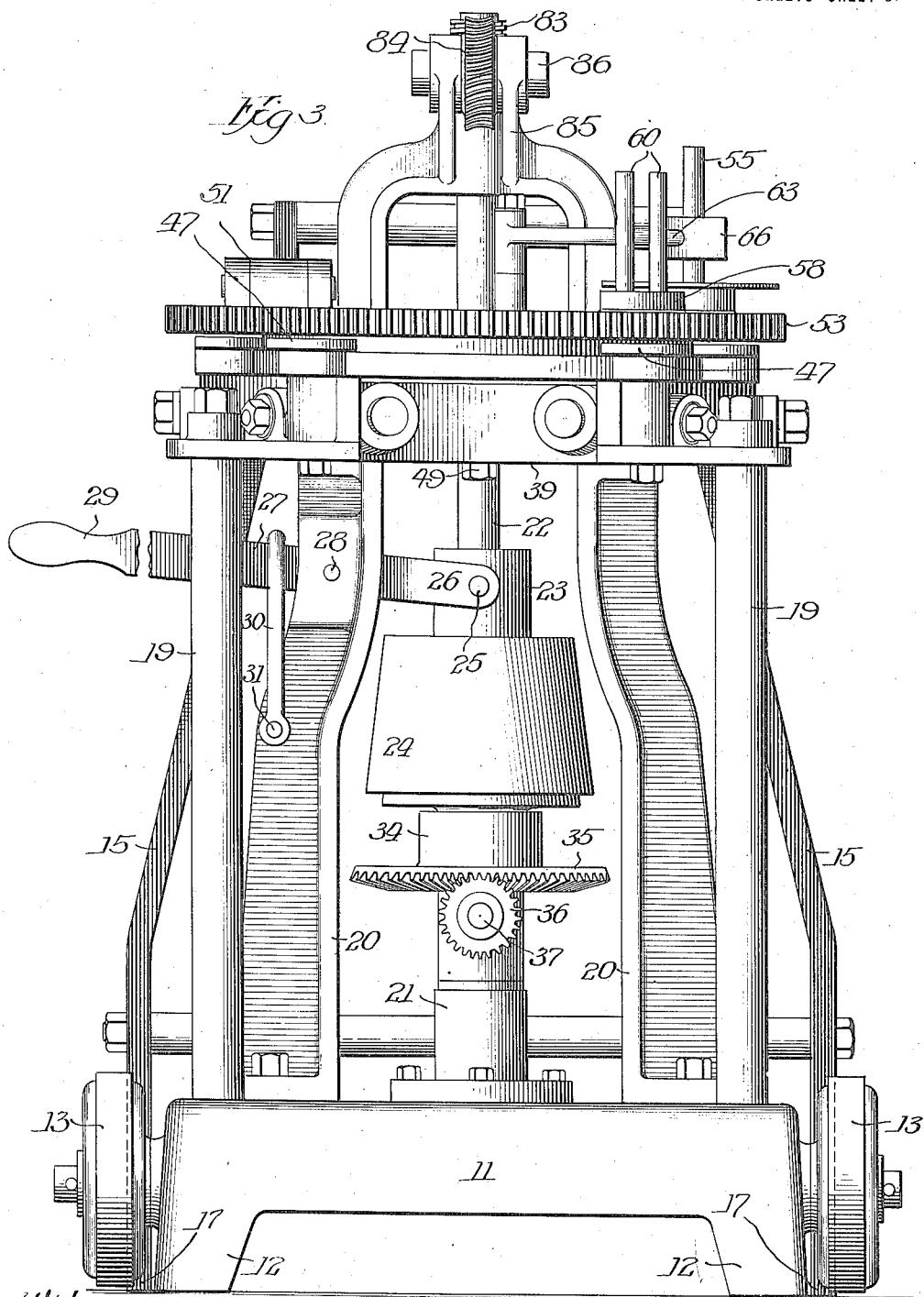

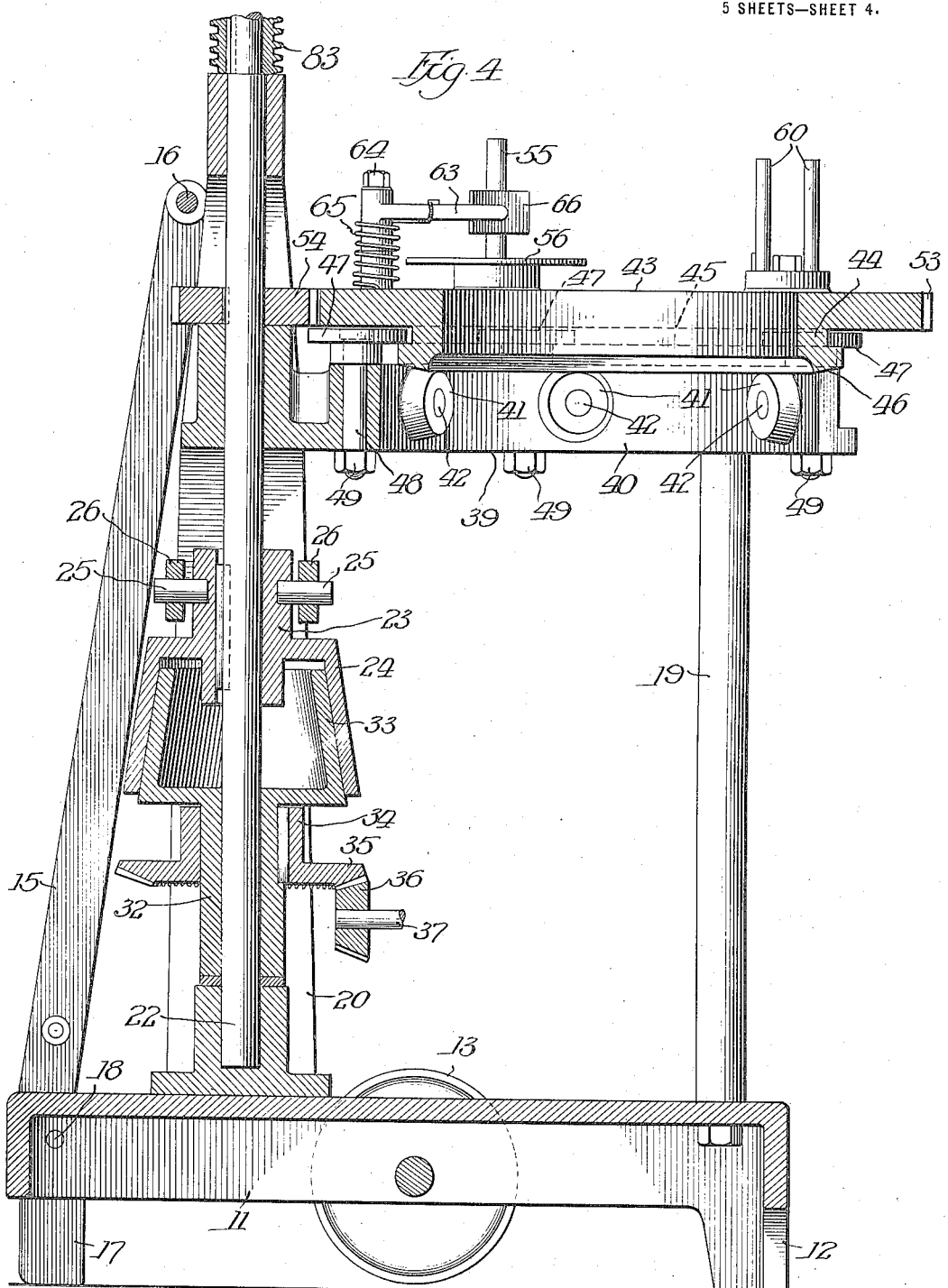

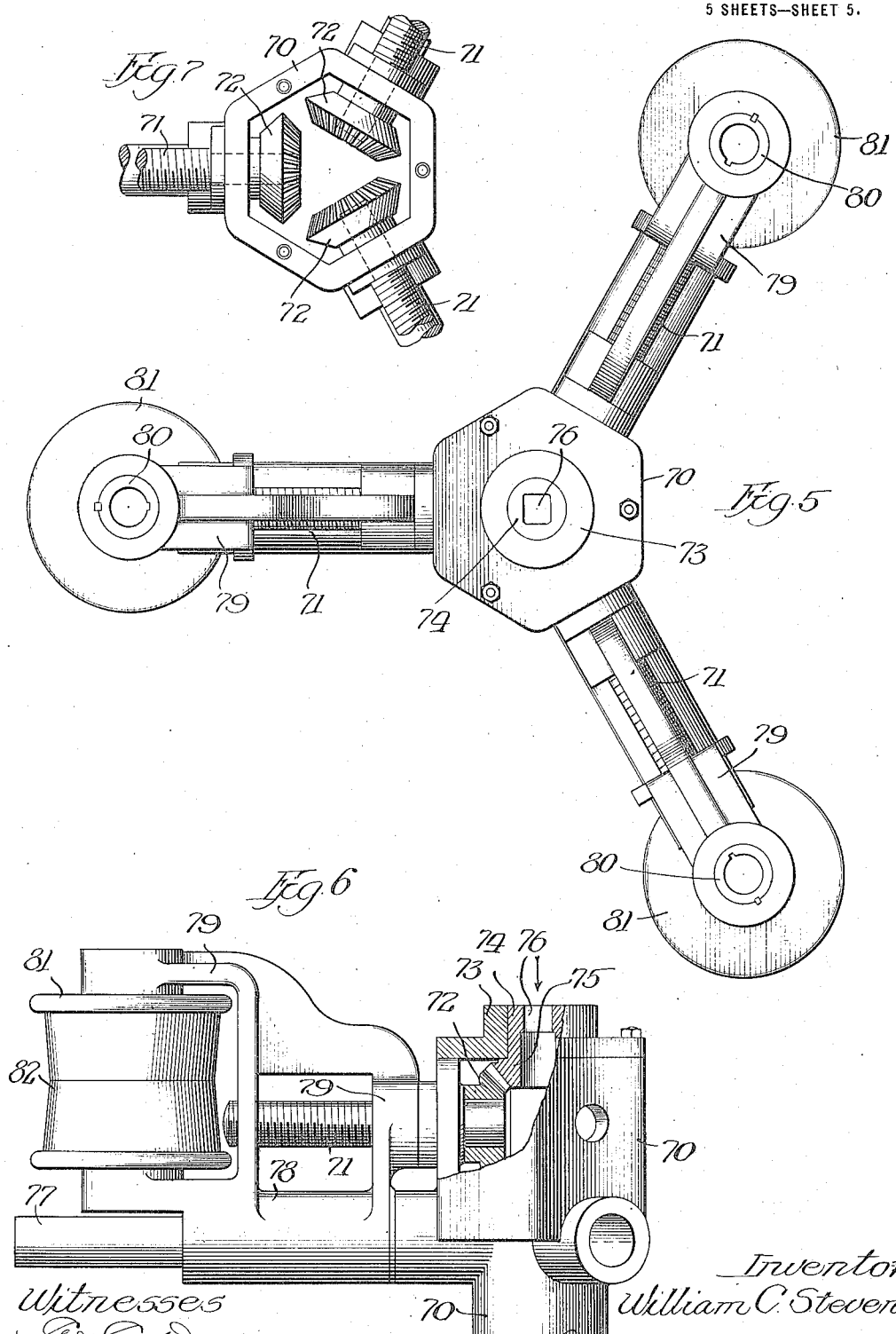

WILLIAM C. STEVENS, OF AKRON, OHIO, ASSIGNOR TO THE FIRESTONE TIRE AND RUBBER COMPANY, OF AKRON, OHIO, A CORPORATION OF OHIO.

PORTABLE WRAPPING-MACHINE.

1,194,565.      Specification of Letters Patent.      Patented Aug. 15, 1916.

Application filed April 12, 1913. Serial No. 760,614.

*To all whom it may concern:*

Be it known that I, WILLIAM C. STEVENS, a citizen of the United States, residing at Akron, in the county of Summit and State of Ohio, have invented certain new and useful Improvements in Portable Wrapping-Machines, of which the following is a specification.

In the manufacture of pneumatic tires such as those adapted for use on motor vehicles, some are "full mold cure" while others are "wrapped tread cure." The machine forming the subject matter of this invention is designed for use more particularly in connection with the manufacture of tires of the latter class. In the making of wrapped tread cure tires, the tire or carcass is built-up from successive layers of fabric and covered with a light layer of rubber while upon a suitable form or core after which it is placed in a mold and semi-cured. The tire is then removed with its core from the mold and mounted upon a spider of some suitable form and the peripheral portion or tread is roughened and cement applied, after which the tread is applied and then the tire is tightly wrapped while on the core with the layer or layers of canvas or other fabric spirally applied in order to retain the tire in shape while undergoing the final cure. Hitherto it has been usual to transfer the core and tire from one spider to another for the carrying out of the different steps of the process and to wrap the tire by hand or on a machine requiring the transfer of the tire from the spider upon which it was previously held. By my invention the tire remains upon the same spider from the taking out of the mold after the first cure until the completion of its wrapping and its removal for the final cure, and I accomplish this by the provision of a particular form of spider and a wrapping machine adapted to coöperate in the act of applying the protective wrapping to the built-up tire while on the core and held by the spider.

The invention also embraces the provision of a wrapping machine adapted to be readily moved from place to place to bring it into action successively upon tires supported upon different spiders, the machine including its own driving mechanism and provided with means for coupling onto the different spiders whereby to revolve the tires held thereby in isochronism with itself, the wrapping machine and spider coöperating to automatically wrap a tire in a most approved manner with uniformity and despatch at a great saving in time and consequent reduction of cost to manufacture as well as an improvement in quality of work.

In order that the invention may be readily understood by those skilled in this art, I have illustrated and described the same as embodied in a preferred form. As, however, the invention is manifestly capable of embodiment in other and varied structural forms it is to be understood that the drawing and description based thereon are to be considered in an illustrative and not in an unnecessarily limiting sense.

In the drawings: Figure 1 is a side elevation of a machine embodying the invention; Fig. 2 is a top plan view thereof; Fig. 3 is a rear view of the wrapping machine proper without the tireholder; Fig. 4 is a partial vertical longitudinal section; Fig. 5 is a side elevation of the spider removed from its support; Fig. 6 is an edge view of one of the spider arms and pulley; and Fig. 7 is a fragmentary view showing the means for adjusting the spider arms.

In the drawings the reference numeral 11 designates the base of the machine resting at the rear end upon legs 12 and in its medial portion provided with a pair of wheels 13, while at its forward edge are pivoted at 14 a pair of bars 15 connected at one end by a handle 16, the opposite end of the bars extending at 17 beyond the pivotal point 14 a distance corresponding to the height of the legs 12 and adapted to support the forward end of the base when the handle-bars are swung to an upright position as indicated in Fig. 1, in which position the wheels 13 clear the floor. When the handle-bars are swung downward the projections 17 abut against the studs 18 and the machine can then be drawn from one plate to another rolling upon the wheels 13. When brought to the proper position for use the handle-bars are again swung to the position indicated in Fig. 1 lifting the wheels 13 from the floor and leaving the machine supported upon the legs 12 and projections 17 so as not to be readily displaced.

Upon the base 11 is carried the machine frame comprising the rods 19, 19, and the standards 20, 20, which in turn support a table which will be hereafter described.

Between the standards 20, 20 is mounted a footstep bearing 21 in which is journaled the lower end of the main shaft 22 keyed to the hub 23 of the friction drum 24 in such manner as to allow of longitudinal movement only. The hub 23 is provided with trunnions 25, 25 which are pivotally engaged by the ends 26 of the bifurcated lever arm 27 which is fulcrumed at 28 in one of the standards 20 and extends from the machine terminating in a handle 29. A detent link 30 pivoted to the standard 20 at 31 is adapted to be engaged over the lever 27 to hold the handle thereof in depressed position. Loosely mounted upon the shaft 22 is the hub 32 of a friction cone 33 disposed within the friction drum 24, and upon the hub 32 is keyed the hub 34 of a crown pinion 35 in mesh with a bevel pinion 36 upon the shaft 37 of the motor 38. By means of the handle 29 of the lever the drum 24 is brought into and out of fulcrum engagement with the continuously rotating cone 33 whereby the shaft 22 is intermittently driven at will.

The table 39 supported by the rods 19 and standards 20 has a central opening 40 and about the inner wall of the same are mounted a plurality of conical anti-friction rollers 41 upon horizontally disposed axles 42. Above the central opening of the table is mounted an annular gear 43 having a downwardly extending hub portion 44 provided with a peripheral groove 45 and a lower beveled face 46 resting upon the conical anti-friction roller 41. Within the peripheral groove 45 engages the periphery of a guide disk 47, rotatably mounted upon the upper end of a stud 48 rigidly held in the frame by means of the nut 49. The annular gear 43 has a removable segment 50 hinged at 51, a dowel pin 52 being provided to retain the segment in immovable relation to the remainder of the gear when in place.

The peripherally arranged teeth 53 of the annular gear are in mesh with the teeth of a pinion 54 keyed upon the main shaft 22 whereby the gear 43 is revolved upon the anti-friction rollers 41 being held from tipping by the guide disk 47 engaging within the groove 45. Upon the upper face of the gear 43 is eccentrically mounted upon the spindle 55 a spool 56, adapted to contain a supply of canvas or other suitable fabric in the form of a web 57, while similarly mounted upon the gear is a tension plate 58 upon the stud 59, said plate having upstanding pins 60, 60, about which the web is guided and the relative position of which is altered by the angular adjustment of the plate 58, such adjustment being provided for by the segmental slot 61 and the clamping nut 62. A tension arm 63 pivoted at 64 upon the gear 43 is pressed by means of the spring 65 against the web, a friction plate 66 being carried by the arm 63 for contact with the web.

The tire 67 is held by a spider 68 revolubly mounted in a suitable support, not shown. This spider is of a particular construction which adapts the same for use at the different stages of manufacture of the tire without necessitating the transfer of the tire from one spider to another. In the early stages of manufacture it is desired that the arms of the spider occupy a fixed position with reference to the tire, and the spider arms rotate with the tire about their common axis, while in the latter stages of manufacture, as for instance the wrapping of the tire, the spider is to be held stationary and the tire to revolve about the spider as a central support. In order to provide for these two conditions of use it is necessary that the arms be radially adjustable and provided with anti-friction supporting means for contact with the tire itself. To attain these objects the spider is constructed in the following manner: The hub 70 of the spider has journaled therein three screw spindles 71 having mounted upon their inner adjacent ends miter gears 72 and upon one end of the hub is mounted a plate 73 within which is journaled the hub 74 of a miter gear 75 which is in mesh with each of the three gears 72, said hub 74 being provided with an angular opening 76 by means of which the miter gears 75 may be angularly adjusted. Radiating from the hub 70 in parallel relation to the screw spindle 71 are arms 77 upon which are guided sleeves 78, the portion 79 of which is interiorly threaded for engagement with the corresponding screw spindle. The sleeve 78 is provided with a bracket portion 79 in the branches of which are journaled the two ends of a hollow axle 80 of a pulley 81 having a concave face 82 adapted to receive and support the inner face of the tire 67.

It will be readily understood that by the angular adjustment of the miter gear 75 the screw spindles will be rotated in unison and thereby the arms of the spider will be telescopically adjusted in an equal degree radially so as to cause the pulleys 81 to bear against the inner face of the tire with any degree of pressure required. If the spider and tire are to be rotated together the degree of pressure should be regulated to hold the tire on the pulleys without relative movement and if the tire is to be revolved about the spider the pressure should be sufficient only to insure retention in rolling contact.

The preliminary stages of manufacture of the tire having been completed the portable wrapping machine proper is wheeled to a position adjacent the tire and spider and the hinged segment 50 of the gear 43 having been raised the machine is swung to a position so that the tire will enter through the gap left by the lifted segment. The segment will then be restored to its closed position and the tire will occupy a position as indicated in Figs. 1 and 2 within the annular gear, that is to say, the gear and tire will occupy planes substantially at right angles to each other, the tire extending through the central opening or eye of the gear and the gear will extend through the central space or eye of the tire in linked relation.

In order to revolve the tire about the spider in proper timed relation to the revolution of the annular gear the following described driving connection between the main shaft and one of the pulleys of the spider is provided. Upon the upper end of the main shaft 22 is mounted a worm 83 which is in mesh with the worm wheel 84 journaled in a bracket 85 carried by the machine frame. The hub 86 of the worm wheel 84 is hollow and provided with a keyway while the hollow axle 80 of each pulley 81 is likewise provided with a keyway.

A portable jack shaft 87 carries at each end a boxing 88 and 89, within which are journaled the miter gears 90 and 91 fixed upon the jack shaft 87. Within the boxing 88 is likewise journaled a transverse stub shaft 92 provided with a rib or integral key 93 adapted to enter the keyway of the worm wheel, and upon the stud shaft 92 is fixed a miter gear 94 in mesh with the gear 90. The boxing 89 has journaled therein a stub shaft 95 provided with an integral rib or key 96 adapted to enter the keyway of one of the pulleys 81, the shaft 95 being also provided with a miter gear 97 in mesh with the gear 91. When the two stub shafts 92 and 95 are inserted into the hollow axles of the worm wheel and pulley the rotary motion of the main shaft 22 is transmitted, as will be readily understood, to the said pulley 81 which latter serves as a friction driving means whereby the tire is revolved about the three pulleys 81, and simultaneously therewith the web spool and tension device mounted upon the annular gear are revolved therewith. It will thus be seen that the tire and the web supply mechanism are caused to revolve in orbits having an angular relation one to the other, the orbit of one passing through the orbit of the other and the end of the web having been preliminarily adapted to the tire the web is supplied spirally to the slowly revolving tire without interference from the arms of the spider.

I claim:

1. In combination, means for passing a strip of material spirally about an annular object, a support for said object on which the same may be rotated, means associated with the support by which the object and the support may be locked against relative movement, and means for rotating the object relative to the support.

2. In combination, means for passing a strip of material spirally about an annular object, a spider, rollers on said spider, on which the object is mounted, means to lock said object in relation to said spider, driving means for the object, and releasable connections for said driving means.

3. In combination, means for passing a strip of material spirally about an annular object, a spider, rollers on said spider, on which the object is mounted, means to force said rollers into locking engagement with said object, driving means for the object, and releasable connections for said driving means.

4. In combination, means for applying a strip of material spirally about an annular object, a support for said object, means effective at will for locking said support in relation to said object, means for rotating said object on said support when the locking means is ineffective, and releasable connections for said rotating means.

5. In combination, means for applying a strip of material spirally about an annular object, a spider, rollers on said spider on which said object is adapted to rest, means effective at will to lock said object in relation to said spider, and means to rotate the object when the locking means is ineffective.

6. In combination, means for applying a strip of material spirally about an annular object, a spider, rollers on said spider on which said object is adapted to rest, means effective at will to lock said object in relation to said spider, and means to rotate one of said rollers when said locking means is ineffective.

7. In combination, means for applying a strip of material spirally about an annular object, a spider, rollers on said spider on which said object is adapted to rest, means effective at will to lock said object in relation to said spider, and means to rotate the object from said material applying means when the locking means is ineffective.

8. In combination, means for applying a strip of material spirally about an annular object, a spider, rollers on said spider on which said object is adapted to rest, means effective at will to lock said object in relation to said spider, and means to rotate one of said rollers from said material applying means when the locking means is ineffective.

9. In a tire wrapping machine, a supporting frame, a shaft, a pinion on the shaft, an annular gear in mesh with the pinion, the gear including a removable segment, a web-spool eccentrically mounted on the gear, a spider arranged to hold a tire in interlinked relation with the gear, the axes of the gear and spider being disposed in substantially perpendicular relation, and a releasable driving connection between the shaft and spider whereby to revolve the tire and the gear in orbits passing one through the other, substantially as described.

10. In a tire wrapping machine, a supporting frame, a shaft, a pinion on the shaft, an annular gear in mesh with the pinion, the gear including a removable segment, a web-spool eccentrically mounted on the gear, a stationary spider arranged to revolubly support a tire in interlinked relation to the gear, and a releasable driving connection between the shaft and the spider whereby to revolve the tire upon the spider and to revolve the web spool in a path passing through the eye of the tire, substantially as described.

11. In a tire wrapping machine, a supporting frame, a drive shaft, a main shaft, a clutch connection between the drive and main shafts, a pinion on the main shaft, an annular gear in mesh with the pinion, the gear including a removable segment, a web-spool eccentrically mounted on the gear, a spider arranged to hold a tire in interlinked relation with the gear, the axes of the gear and spider being disposed in substantially perpendicular relation, and a releasable driving connection between the shaft and spider whereby to revolve the tire and the gear in orbits passing one through the other, substantially as described.

12. In a portable tire wrapping machine, a wheeled supporting frame, a motor mounted therein, a drive shaft, a main shaft, a clutch connection between the drive and main shafts, a pinion on the main shaft, an annular gear in mesh with the pinion, the gear including a removable segment, a web-spool eccentrically mounted on the gear, a stationary spider arranged to revolubly support a tire in interlinked relation to the gear, and a releasable driving connection between the shaft and the spider whereby to revolve the tire upon the spider and to revolve the web-spool in a path passing through the eye of the tire, substantially as described.

13. In a tire wrapping machine, a supporting frame, a shaft, a pinion on the shaft, a table having an opening therein, rollers mounted about the opening, an annular gear in mesh with the pinion and supported by the rollers, the gear including a removable segment, a web-spool eccentrically mounted on the gear, a spider arranged to hold a tire in interlinked relation with the gear, the axes of the gear and spider being disposed in substantially perpendicular relation, and a releasable driving connection between the shaft and spider whereby to revolve the tire and the gear in orbits passing one through the other, substantially as described.

14. In a tire wrapping machine, a supporting frame, a shaft, a pinion on the shaft, a table having an opening therein, rollers mounted about the opening, an annular gear in mesh with the pinion and supported by the rollers, a guide disk engaging within a peripheral groove of the gear, the gear including a hinged segment, a web-spool eccentrically mounted on the gear, a stationary spider arranged to revolubly support a tire in interlocked relation to the gear, and a releasable driving connection between the shaft and the spider whereby to revolve the tire upon the spider and to revolve the web-spool in a path passing through the eye of the tire, substantially as described.

15. In a portable tire wrapping machine, a wheeled supporting frame, a motor mounted therein, a drive shaft, a main shaft, a clutch connection between the drive and main shafts, a pinion on the main shaft, a table having an opening therein, conical rollers mounted about the opening, an annular gear in mesh with the pinion and having an inclined lower face supported by the rollers, a guide disk engaging within a peripheral groove of the gear, the gear including a hinged segment, a web spool eccentrically mounted on the gear, a stationary spider arranged to revolubly support a tire in interlinked relation to the gear, and a releasable driving connection between the shaft and the spider whereby to revolve the tire upon the spider and to revolve the web-spool in a path passing through the eye of the tire, substantially as described.

16. In a tire wrapping machine, a supporting frame, a driven shaft, a pinion on the shaft, a table having an opening therein, an annular gear in mesh with the pinion and supported over the opening, the gear including a removable segment, a web-spool eccentrically mounted on the gear, a tension device mounted on the gear and bearing on the spool, a spider arranged to hold a tire in interlinked relation with the gear, the axes of the gear and spider being disposed in substantially perpendicular relation, and a releasable driving connection between the shaft and spider whereby to revolve the tire and the gear in orbits passing one through the other, substantially as described.

17. In a portable tire wrapping machine, a wheeled supporting frame, a motor mounted thereon, a drive shaft, a driven shaft, a clutch connection between the drive and driven shafts, a pinion on the driven shaft, a table having an opening therein, rollers mounted about the opening, an annular gear in mesh with the pinion and supported by the rollers, a gear including a removable segment, a web-spool eccentrically mounted on the gear, a friction device mounted on the gear and bearing on the spool, adjustable friction guides traversed by the web, a spider arranged to revolubly support a tire in interlinked relation to the gear, and a releasable driving connection between the shaft and the spider whereby to revolve the tire upon the spider and to revolve the web spool in a path passing through the eye of the tire, substantially as described.

18. In a tire wrapping machine, a supporting frame, a shaft, a pinion on said shaft, an annular gear in mesh with the pinion, a web holding spool eccentrically mounted on the gear, means to hold a tire linked within the annular gear, said means comprising a spider having radial arms, pulleys carried by the arms and adapted to form a rolling support for the inner face of the tire, means to drive the shaft, and means to drive one of said pulleys whereby to revolve the web holder and tire in orbits passing one through the other, substantially as described.

19. In a tire wrapping machine, a supporting frame, a shaft, a pinion on said shaft, an annular gear in mesh with the pinion, a web holding spool eccentrically mounted on the gear, means to hold a tire linked within the annular gear, said means comprising a spider having telescopic radial arms, each arm including a screw spindle, and a threaded sleeve, means common to the arms for imparting relative movement to the spindles and sleeves whereby to radially adjust the length of the arms, pulleys carried by the outer members of the arms and adapted to form a rolling support for the inner face of the tire, means to drive the shaft and one of said pulleys whereby to revolve the web holder and tire in orbits passing one through the other, substantially as described.

20. In a tire wrapping machine, a supporting frame, a shaft, a pinion on said shaft, an annular gear in mesh with the pinion, a web holding spool eccentrically mounted on the gear, means to hold a tire linked within the annular gear, said means comprising a spider having telescopic radial arms, the inner member of each arm formed as a screw spindle and the outer member as a threaded sleeve, bevel pinions carried by the inner ends of the spindles, a bevel gear in mesh with the pinions, means to angularly adjust the gear whereby to simultaneously vary the length of the arms, concave pulleys carried by the sleeve members and adapted to form a rolling support for the inner face of the tire, and common driving means for the shaft and one of said pulleys whereby to revolve the web holder and tire in orbits passing one through the other, substantially as described.

21. In a portable tire wrapping machine, a wheeled supporting frame, a motor mounted therein, a drive shaft, a main shaft, a clutch connection between the drive and main shafts, a pinion on the main shaft, a table having an opening therein, conical rollers mounted about the opening, an annular gear in mesh with the pinion and having an inclined lower face supported by the rollers, a guide disk engaging within a peripheral groove of the gear, the gear including a hinged segment, a web spool eccentrically mounted on the gear, a spider arranged to hold the tire in interlinked relation with the gear, the axis of the gear and spider being disposed in substantially perpendicular relation, the spider having telescopic radial arms, the inner member of each arm formed as a screw spindle and the outer member as a threaded sleeve, bevel pinions carried by the inner ends of the spindles, a bevel gear in mesh with the pinions, means to angularly adjust the gear whereby to vary the length of the arms, concave pulleys carried by the sleeve members and adapted to form a rolling support for the inner face of the tire, and a releasable connection between the driven shaft and one of said pulleys whereby the web holder and tire are simultaneously revolved in orbits passing one through the other, substantially as described.

22. In a tire wrapping machine, a supporting frame, a shaft, a pinion on said shaft, an annular gear in mesh with the pinion, a web holding spool eccentrically mounted on the gear, means to hold a tire linked within the annular gear, said means comprising a spider having radial arms, pulleys carried by the arms and adapted to form a rolling support for the inner face of the tire, one of the pulleys having an angular aperture, a rotary member driven by the shaft and having an angular axial aperture, and a removable transmission drive comprising a jack shaft, a pair of stub shafts extending angularly with relation to the jack shaft, and gearing connecting the stub shafts adapted to releasably engage within the angular apertures of the rotary members, substantially as described.

23. In a portable tire wrapping machine, a wheeled supporting frame, a motor mounted therein, a drive shaft, a main shaft, a clutch connection between the drive and main shafts, a pinion on the main shaft, a table having an opening therein, conical rollers mounted about the opening, an annular gear in mesh with the pinion and having an inclined lower face supported by the rollers, a guide disk engaging within a peripheral groove of the gear, the gear including a hinged segment, a web spool eccentrically mounted on the gear, a spider arranged to hold the tire in interlinked relation with the gear, the axis of the gear and spider being disposed in substantially perpendicular relation, the spider having telescopic radial arms, the inner member of each arm formed as a screw spindle and the outer member as a threaded sleeve, bevel pinions carried by the inner ends of the spindles, a bevel gear in mesh with the pinions, means to angularly adjust the gear whereby to vary the length of the arms, concave pulleys carried by the sleeve members and adapted to form a rolling support for the inner face of the tire, one of the pulleys having an angular axial aperture, a rotary member driven by the shaft and having an angular axial aperture, and a removable transmission drive comprising a jack shaft, a pair of stub shafts extending angularly with relation to the jack shaft, and gearing connecting the stub shafts with the jack shaft, the free ends of the stub shafts adapted to releasably engage within the angular apertures of the rotary members, substantially as described.

WILLIAM C. STEVENS.

Witnesses:
S. G. CARRHUFF,
E. M. HAHN.